(12) United States Patent
Kim (10) Patent No.: US 12,122,403 B2
(45) Date of Patent: Oct. 22, 2024

(54) METHOD FOR GENERATING WARNING SIGNAL OF INTEGRATED CONTROL APPARATUS FOR AUTONOMOUS VEHICLES

(71) Applicants: Hyundai Motor Company, Seoul (KR); Kia Corporation, Seoul (KR)

(72) Inventor: Eun Sik Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 326 days.

(21) Appl. No.: 17/729,350

(22) Filed: Apr. 26, 2022

(65) Prior Publication Data

US 2023/0080993 A1 Mar. 16, 2023

(30) Foreign Application Priority Data

Sep. 10, 2021 (KR) ........................ 10-2021-0121056

(51) Int. Cl.
| | |
|---|---|
| *B60W 50/10* | (2012.01) |
| *B60Q 9/00* | (2006.01) |
| *B60W 50/16* | (2020.01) |
| *B60W 60/00* | (2020.01) |

(52) U.S. Cl.
CPC ............. *B60W 50/10* (2013.01); *B60Q 9/008* (2013.01); *B60W 50/16* (2013.01); *B60W 60/001* (2020.02); *B60W 2420/403* (2013.01); *B60W 2420/408* (2024.01); *B60W 2540/10* (2013.01); *B60W 2540/12* (2013.01); *B60W 2540/16* (2013.01); *B60W 2540/18* (2013.01)

(58) Field of Classification Search
None
See application file for complete search history.

(56) References Cited

U.S. PATENT DOCUMENTS

| | | | |
|---|---|---|---|
| 10,759,445 B2* | 9/2020 | Matsumoto | B60W 50/12 |
| 11,396,305 B2* | 7/2022 | Urano | B60W 40/09 |
| 11,891,076 B1* | 2/2024 | Lopez | B60W 60/0051 |
| 2012/0046817 A1* | 2/2012 | Kindo | B60W 60/0053 |
| | | | 701/23 |
| 2014/0025267 A1* | 1/2014 | Tezuka | B60W 30/18027 |
| | | | 701/51 |
| 2015/0120142 A1* | 4/2015 | Park | B62D 15/025 |
| | | | 701/41 |
| 2018/0299885 A1* | 10/2018 | Herzog | H04N 7/183 |
| 2018/0362028 A1* | 12/2018 | Prokhorov | B62D 15/0255 |
| 2018/0362052 A1* | 12/2018 | Matsumoto | B60W 50/14 |
| 2019/0092341 A1* | 3/2019 | Stark | B60W 10/20 |
| 2019/0161092 A1* | 5/2019 | Kim | B60W 60/0053 |

(Continued)

FOREIGN PATENT DOCUMENTS

KR  10-1166895  7/2012

*Primary Examiner* — Jonathan M Dager
(74) *Attorney, Agent, or Firm* — Morgan, Lewis & Bockius LLP (57) ABSTRACT

A method is configured for generating a warning signal of an integrated control apparatus of autonomous vehicles in which, when the integrated control apparatus is erroneously operated, when a collision risk occurs or when a shifting disallowable situation occurs under the condition that a user manually drives a vehicle by operating the integrated control apparatus, a haptic motor provided in the integrated control apparatus generates the warning signal.

15 Claims, 8 Drawing Sheets

(56) References Cited

U.S. PATENT DOCUMENTS

| | | | | |
|---|---|---|---|---|
| 2019/0367050 A1* | 12/2019 | Victor | ................... | G06V 20/597 |
| 2020/0039584 A1* | 2/2020 | Igarashi | ................. | B62D 1/286 |
| 2020/0307642 A1* | 10/2020 | Tsuji | .................... | B60W 10/04 |
| 2020/0324791 A1* | 10/2020 | Ueno | ................... | G05D 1/0088 |
| 2021/0009194 A1* | 1/2021 | Kim | ..................... | B62D 15/025 |
| 2021/0046946 A1* | 2/2021 | Nemec | ................. | G05D 1/0061 |
| 2021/0053488 A1* | 2/2021 | Ochoa Nieva | ........ | B60W 40/08 |
| 2021/0253134 A1* | 8/2021 | Heimberger | .......... | B60W 50/10 |
| 2021/0331711 A1* | 10/2021 | Voigt | .................... | B60W 50/04 |
| 2021/0370780 A1* | 12/2021 | Cho | ................... | B60L 15/2009 |
| 2022/0009522 A1* | 1/2022 | Zhang | .................. | B60W 30/12 |
| 2022/0057792 A1* | 2/2022 | Kim | ..................... | G05D 1/0016 |
| 2022/0176982 A1* | 6/2022 | Kakeshita | ............. | B60W 50/12 |
| 2022/0219678 A1* | 7/2022 | Suzuki | ............... | B60W 60/001 |
| 2022/0234591 A1* | 7/2022 | Kuehner | ................ | A41D 27/10 |
| 2022/0234611 A1* | 7/2022 | Suzuki | .............. | B60W 60/0053 |
| 2022/0274613 A1* | 9/2022 | White | ................. | B60W 50/082 |
| 2022/0297681 A1* | 9/2022 | Yoshinaga | ...... | B60W 30/18109 |
| 2023/0052064 A1* | 2/2023 | Kawahara | ............. | B60W 10/04 |
| 2023/0126269 A1* | 4/2023 | Kim | .................. | B60W 60/0015 |
| | | | | 701/23 |
| 2023/0350447 A1* | 11/2023 | Kim | ....................... | B60K 26/02 |
| 2024/0001950 A1* | 1/2024 | Ravuri | ................. | B60W 10/18 |
| 2024/0067228 A1* | 2/2024 | Kim | ............... | B60W 30/18127 |

\* cited by examiner

METHOD FOR GENERATING WARNING SIGNAL OF INTEGRATED CONTROL APPARATUS FOR AUTONOMOUS VEHICLES

CROSS-REFERENCE TO RELATED APPLICATION

The present application claims priority to Korean Patent Application No. 10-2021-0121056, filed on Sep. 10, 2021, the entire contents of which is incorporated herein for all purposes by this reference.

BACKGROUND OF THE PRESENT DISCLOSURE

Field of the Present Disclosure

The present disclosure relates to a method for generating a warning signal of an integrated control apparatus of autonomous vehicles in which, when the integrated control apparatus is erroneously operated, when a collision risk occurs or when a shifting disallowable situation occurs under the condition that a user manually drives a vehicle by operating the integrated control apparatus, a haptic motor provided in the integrated control apparatus generates the warning signal.

Description of Related Art

An autonomous vehicle is a vehicle configured for autonomously traveling to a destination using autonomous driving technology without driver's direct control of a steering wheel, an accelerator pedal, a brake, etc.

When an autonomous driving situation is universally implemented, the driver may select one out of a manual driving mode in which the driver directly drives the vehicle and an autonomous driving mode in which the vehicle autonomously travels to a destination without driver control.

When an emergency occurs during autonomous driving, anyone of passengers of the vehicle must directly manually drive the vehicle, and for the present purpose, the vehicle must be provided with an apparatus operated by a user to execute the manual driving mode.

For example, a vehicle manager may control the vehicle using an apparatus, such as a joystick used in game machines or the like, in the manual driving mode.

Such an apparatus operated by the user to drive the vehicle in a manual driving mode situation is provided with a plurality of switches operated to perform acceleration, braking, steering, and shifting of the vehicle, and is referred to as an integrated control apparatus because switches having different functions are provided therein.

However, the conventional integrated control apparatus does not have a function of providing a warning signal to a user in a situation in which the user erroneously operates the switches or a collision risk occurs, and is thus disadvantageous in that there is an increased danger of accidents.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for generating a warning signal of an integrated control apparatus of autonomous vehicles in which, when the integrated control apparatus is erroneously operated, when a collision risk occurs or when a shifting disallowable situation occurs under the condition that a user manually drives a vehicle by operating the integrated control apparatus, a haptic motor provided in the integrated control apparatus is configured to generate the warning signal, and accordingly, the user recognizes the warning signal through tactile sensation to reduce a danger of accidents.

Various aspects of the present disclosure are directed to providing a method for generating a warning signal of an integrated control apparatus of autonomous vehicles in which different kinds of warning signals are generated by varying the operation of a haptic motor depending on kinds of erroneous operations or when a collision risk occurs, so that a user may easily recognize respective cases through the corresponding warning signals.

In accordance with various aspects of the present disclosure, the above and other objects may be accomplished by the provision of a method for generating a warning signal of an integrated control apparatus of autonomous vehicles, the method including determining whether switches provided in the integrated control apparatus are erroneously operated when a user manually drives a vehicle by operating the integrated control apparatus, wherein, as a result of the determining as to whether the switches provided in the integrated control apparatus are erroneously operated, upon determining that the switches provided in the integrated control apparatus are not erroneously operated, a haptic motor provided in the integrated control apparatus is not operated, and upon determining that the switches provided in the integrated control apparatus are erroneously operated, the haptic motor is operated to generate the warning signal.

The operation of the haptic motor may be controlled by a printed circuit board (PCB) provided in the integrated control apparatus.

The switches provided in the integrated control apparatus may include an acceleration switch, a brake switch, a steering switch, a shift switch and a dead man's switch, and a first case in which it is determined that the switches provided in the integrated control apparatus are erroneously operated may be a case in which one of the acceleration switch, the brake switch, the steering switch and the shift switch is operated without operation of the dead man's switch.

In the first case in which it is determined that the switches provided in the integrated control apparatus are erroneously operated, the haptic motor may be operated at a lowest intensity or vibration displacement or may be operated to have a longest rest time.

The switches provided in the integrated control apparatus may include an acceleration switch, a brake switch, a steering switch, a shift switch and a dead man's switch, and a second case in which it is determined that the switches provided in the integrated control apparatus are erroneously operated may be a case in which the acceleration switch and the brake switch are simultaneously operated.

In the second case in which it is determined that the switches of the integrated control apparatus are erroneously operated, the haptic motor may be operated at a moderate intensity or vibration displacement or may be operated to have a middle rest time.

The method may further include determining whether a shifting disallowable situation occurs when the user operates the switches provided in the integrated control apparatus, and as a result of the determining as to whether the shifting disallowable situation occurs, upon determining that the shifting disallowable situation does not occur, the haptic motor provided in the integrated control apparatus may not be operated, and upon determining that the shifting disallowable situation occurs, the haptic motor may be operated to generate the warning signal and the vehicle maintains a previous gear position.

The switches provided in the integrated control apparatus may include an acceleration switch, a brake switch, a steering switch, a shift switch and a dead man's switch, and a third case in which it is determined that the shifting disallowable situation occurs may be a case in which a gear position of the vehicle is shifted from a drive (D) gear position to a reverse (R) gear position or is shifted from the reverse (R) gear position to the drive (D) gear position when the vehicle is not stopped.

In the third case in which it is determined that the shifting disallowable situation occurs, the haptic motor may be operated while varying an intensity or vibration displacement of the haptic motor or while varying a frequency of the haptic motor.

The method may further include determining whether a collision risk occurs when the user utilizes the integrated control apparatus, and as a result of the determining as to whether the collision risk occurs, upon determining that the collision risk does not occur, the haptic motor provided in the integrated control apparatus may not be operated, and upon determining that the collision risk occurs, the haptic motor may be operated to generate the warning signal.

An autonomous driving controller may be configured to determine whether the collision risk occurs by receiving signals from detectors provided in the vehicle, upon determining that the collision risk occurs, the autonomous driving controller may transmit a control signal to a printed circuit board (PCB) provided in the integrated control apparatus, and the haptic motor may be operated under control of the PCB to generate the warning signal.

The detectors configured to transmit the signals indicating the collision risk to the autonomous driving controller may include cameras and radars of a Forward Collision-Avoidance Assist (FCA) system and a Blind-spot Collision-Avoidance Assist (BCA) system.

Upon determining that the collision risk occurs, the haptic motor may be operated at a highest intensity or vibration displacement or may be operated to have a shortest rest time.

The haptic motor may be set to be operated at different intensities or to have different rest times depending on cases in which it is determined that the switches provided in the integrated control apparatus are erroneously operated, as a result of the determining as to whether the switches are erroneously operated.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions in embodiments of the present disclosure set forth in the description which follows will be exemplarily provided to describe the exemplary embodiments of the present disclosure. However, the present disclosure may be embodied in many alternative forms, and should not be construed as being limited to the exemplary embodiments set forth herein.

The exemplary embodiments of the present disclosure may be variously modified and changed, and thus specific embodiments of the present disclosure will be illustrated in the drawings and described in detail in the following description of the exemplary embodiments of the present disclosure. However, it will be understood that the exemplary embodiments of the present disclosure are provided only to completely disclose the present disclosure and cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

Controllers (control units) according to exemplary embodiments of the present disclosure may be implemented through a non-volatile memory configured to store an algorithm configured to control operations of various elements of a vehicle or data regarding software commands for reproducing the algorithm and a processor configured to perform operations which will be described below using data stored in the corresponding memory. The memory and the processor may be implemented as individual chips. Alternatively, the memory and the processor may be implemented as a single integrated chip. Here, the processor may be provided in a form of one or more processors.

Hereinafter, a method for generating a warning signal of an integrated control apparatus of autonomous vehicles according to various exemplary embodiments of the present disclosure will be described with reference to the accompanying drawings.

An autonomous vehicle includes an integrated control apparatus directly operated by a user (or a manager) to drive the autonomous vehicle in the manual driving mode.

Integrated control apparatuses include a one-handed integrated control apparatus which the user may hold with one hand to operate switches or the like provided therein, and a two-handed integrated control apparatus which the user holds with both hands to operate switches or the like provided therein.

Figure 1:
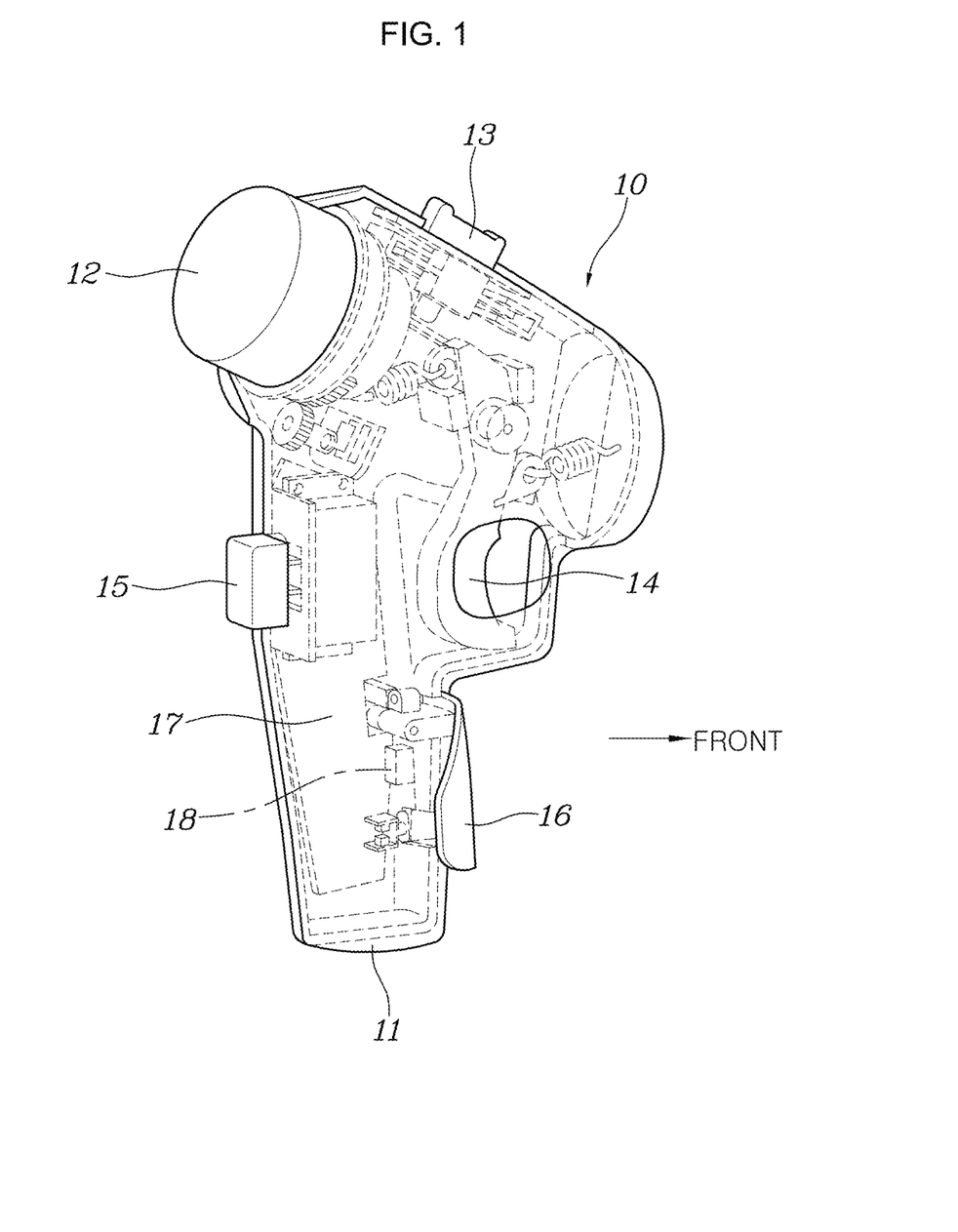
FIG. 1 is a view exemplarily illustrating a one-handed integrated control apparatus including a haptic motor according to an exemplary embodiment of the present disclosure.

FIG. 1 is a view exemplarily illustrating a one-handed integrated control apparatus according to an exemplary embodiment of the present disclosure.

The one-handed integrated control apparatus 10 includes a housing 11, a steering switch 12, a shift switch 13, an acceleration switch 14, a brake switch 15, a dead man's switch 16, and a printed circuit board (PCB) 17.

The steering switch 12 is a dial switch which is operated by rotation thereof, the shift switch 13 is a slide switch which is operated by pushing or pulling, the acceleration switch 14 is a trigger switch which is operated by pulling, the brake switch 15 is a button switch which is operated by pressing, and the dead man's switch 16 is a tactile switch which is operated by pressing.

When a user operates any one of the steering switch 12, the shift switch 13, the acceleration switch 14 and the brake switch 15, the PCB 17 generates a signal corresponding to the operated switch.

The dead man's switch 16 is a switch which is operated by the user to implement steering, shifting, acceleration and braking, and only when the user operates one of the steering switch 12, the shift switch 13, the acceleration switch 14 and the brake switch 15 under the condition that the user operates the dead man's switch 16, the function of the operated switch is executed.

When the user operates one of the steering switch 12, the shift switch 13, the acceleration switch 14 and the brake switch 15 under the condition that the user does not operate the dead man's switch 16, the function of the operated switch is not executed, and a warning signal is generated and is then transmitted to the user as a tactile signal.

The warning signal is generated by operation of a haptic motor 18, and operation of the haptic motor 18 is controlled by the PCB 17.

Functions corresponding to steering, shifting, acceleration and braking of the vehicle are important main factors directly related to safety of passengers, and when the user operates the steering switch 12, the shift switch 13, the acceleration switch 14 or the braking switch 15 in consideration of safety of passengers, the user must operate a desired kind of switch (i.e., one of the steering switch 12, the shift switch 13, the acceleration switch 14 and the braking switch 15) under the condition that the user first operates the dead man's switch 16.

On the other hand, when the user operates one of other general functional switches, the function of the operated general functional switch is immediately executed regardless of operation of the dead man's switch 16.

That is, functions corresponding to the lamps, horn and direction indicator of the vehicle are subsidiary elements which are not directly related to safety of passengers and thus, when the user operates one of the general functional switches under the condition that the user operates the dead man's switch 16, the function of the operated general functional switch is immediately executed, and even when the user operates one of the general functional switches under the condition that the user does operate the dead man's switch 16, the function of the operated general functional switch is immediately executed also.

Figure 2:
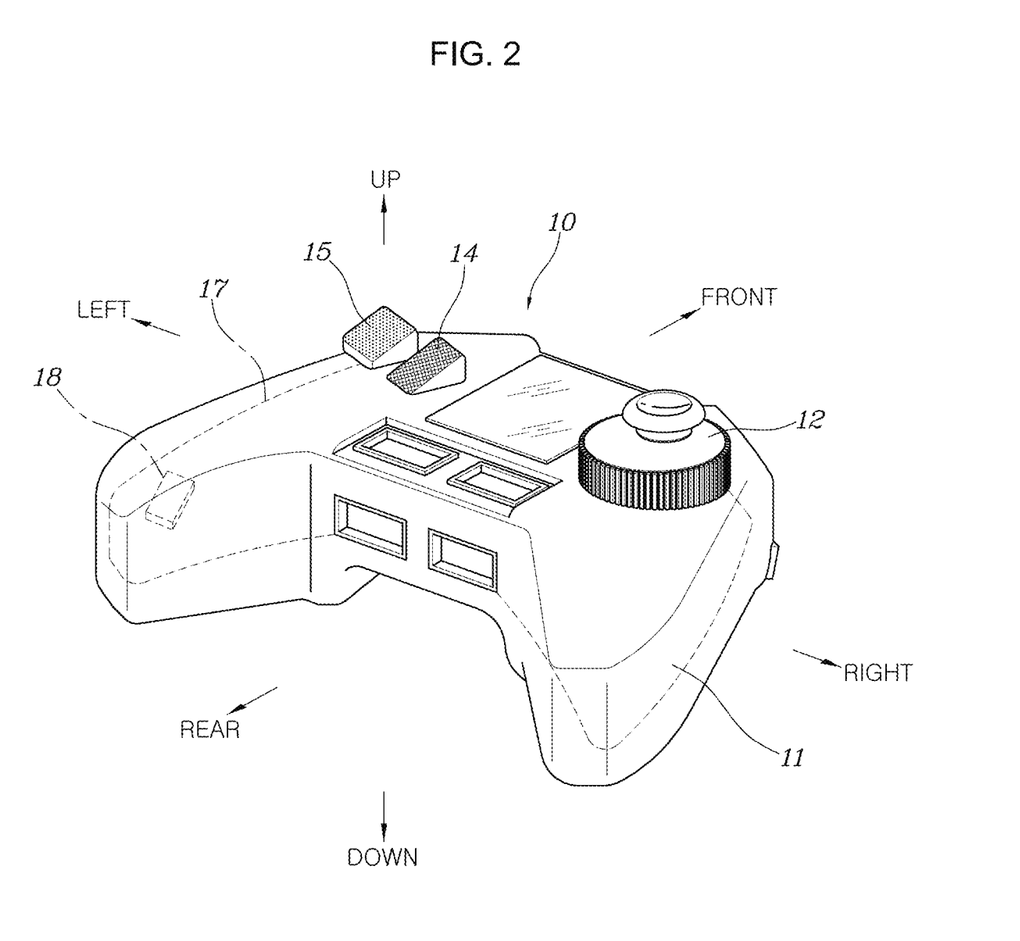
FIG. 2 and FIG. 3 are views exemplarily illustrating a two-handed integrated control apparatus including a haptic motor according to an exemplary embodiment of the present disclosure.
Figure 3:
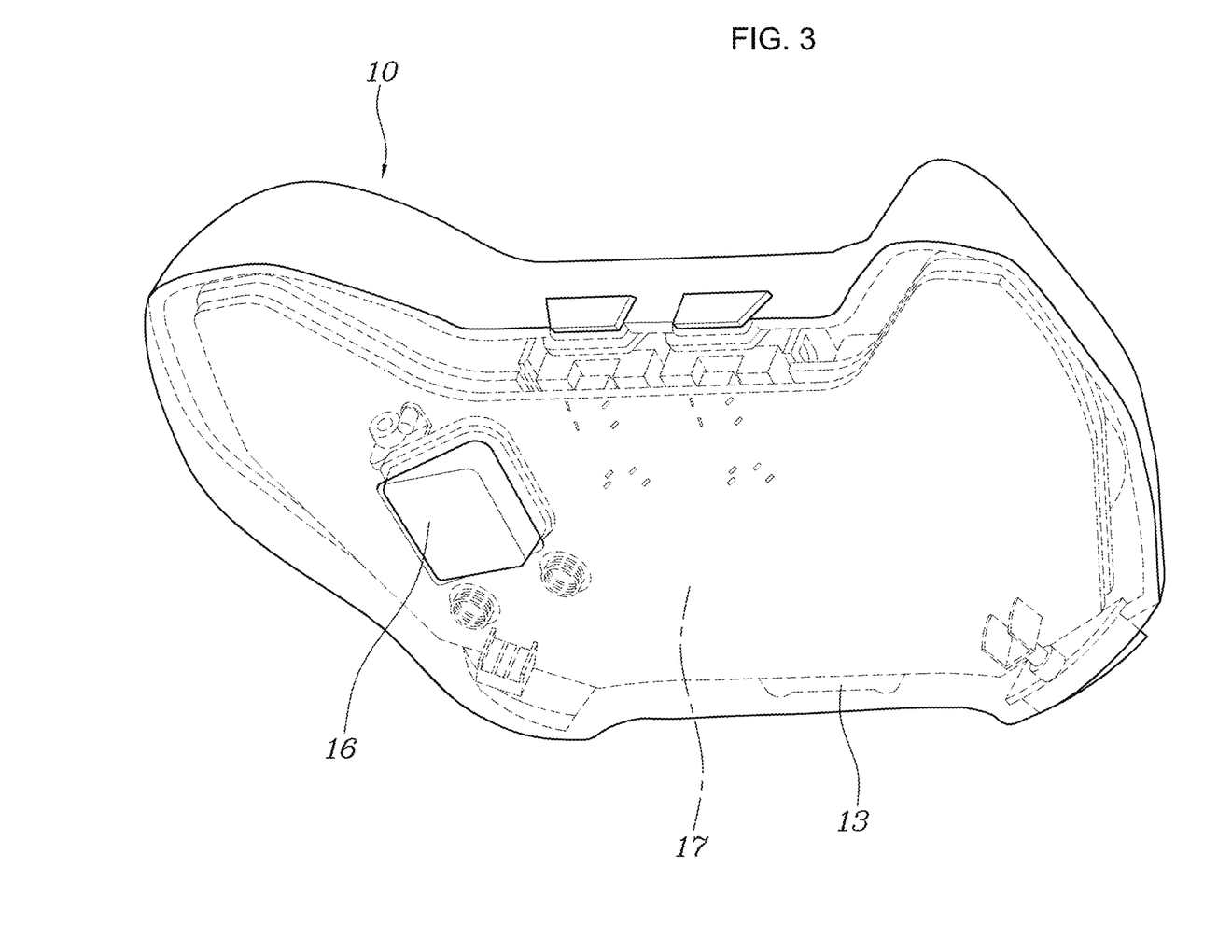

FIG. 2 and FIG. 3 are views exemplarily illustrating a two-handed integrated control apparatus including a haptic motor according to an exemplary embodiment of the present disclosure.

The two-handed integrated control apparatus has a different shape from the one hand-operated integrated control apparatus but includes elements which are substantially the same as those of the one hand-operated integrated control apparatus, and thus, these elements of the two-handed integrated control apparatus are denoted by the same reference numerals even when they are depicted in different drawings.

The two-handed integrated control apparatus 10 includes a housing 11, a steering switch 12, a shift switch 13, an acceleration switch 14, a brake switch 15, a dead man's switch 16, and a printed circuit board (PCB) 17.

The steering switch 12 is a dial switch which is operated by rotation thereof, the shift switch 13 is a slide switch which is operated by pushing or pulling, the acceleration switch 14 and the brake switch 15 are button switches which are operated by pressing, and the dead man's switch 16 is a tactile switch which is operated by pressing.

The dead man's switch 16, the PCB 17 and a haptic motor 18 of the two-handed integrated control apparatus 10 have the same functions as those of the one-handed integrated control apparatus 10, and a detailed description thereof will thus be omitted.

Figure 4:
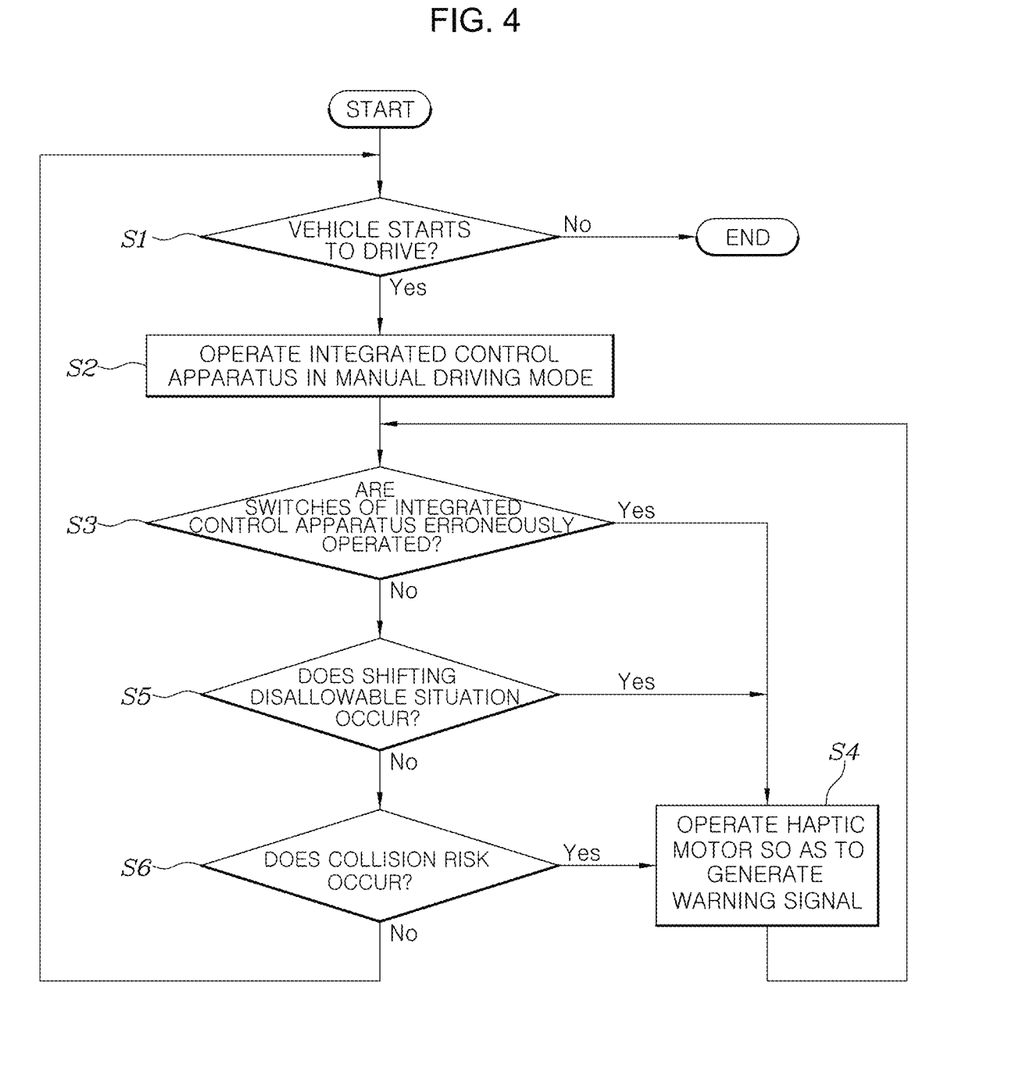
FIG. 4 is a flowchart representing a method for generating a warning signal of an integrated control apparatus according to an exemplary embodiment of the present disclosure.

FIG. 4 is a flowchart representing a method for generating a warning signal of an integrated control apparatus according to an exemplary embodiment of the present disclosure.

Logic according to an exemplary embodiment of the present disclosure is executed when an autonomous vehicle starts to drive and enters a situation in which a user (or a manager) operates the integrated control apparatus 10 to manually drive the autonomous vehicle (i.e., in the manual driving mode), and the logic according to an exemplary embodiment of the present disclosure is not executed in the autonomous driving mode.

When the vehicle starts to drive (Operation S1) and enters the situation in which the user operates the integrated control apparatus 10 to manually drive the autonomous vehicle (i.e., in the manual driving mode) (Operation S2), it is determined whether or not the user erroneously operates the switches provided in the integrated control apparatus 10 (Operation S3).

As a result of the determination as to whether or not the user erroneously operates the switches provided in the integrated control apparatus (Operation S3), upon determining that the user does not erroneously operate the switches provided in the integrated control apparatus, the haptic motor 18 provided in the integrated control apparatus 10 is not operated, and upon determining that the user erroneously operates the switches provided in the integrated control apparatus, the haptic motor 18 provided in the integrated control apparatus 10 is operated to generate a warning signal (Operation S4), and the user (the manager) may easily recognize the erroneous operated situation of the switches through the tactile warning signal generated by the haptic motor 18.

Furthermore, the haptic motor 18 may be set to be operated at different intensities or to have different rest times depending on cases in which it is determined that the user erroneously operates the switches, and these cases may include first to third cases.

Figure 5:
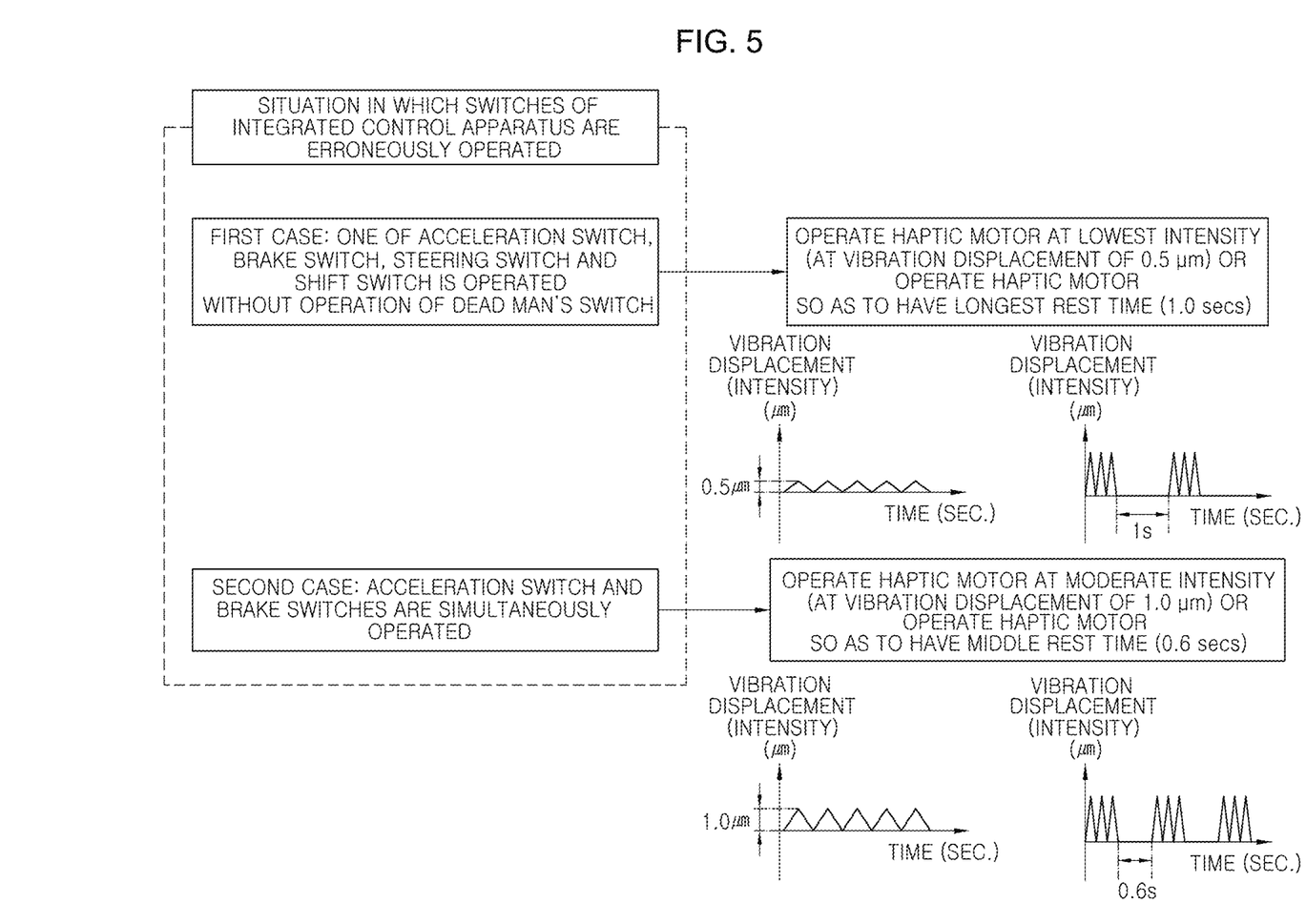
FIG. 5, FIG. 6 and FIG. 7 are views exemplarily illustrating respective embodiments of the present disclosure in which it is determined that the integrated control apparatus is erroneously operated, it is determined that a shifting disallowable situation occurs and it is determined that a collision risk occurs.

FIG. 5 illustrates an exemplary embodiment in which it is determined that the user erroneously operates the switches provided in integrated control apparatus in Operation S3.

That is, the first case in which it is determined that the user erroneously operates the switches provided in the integrated control apparatus is a case in which one of the acceleration switch 14, the brake switch 15, the steering switch 12 and the shift switch 13 is operated without operation of the dead man's switch 16, and in the instant case, the haptic motor 18 is operated at the lowest intensity (a vibration displacement of 0.5 μm) or is operated to have the longest rest time (1.0 secs).

The second case in which it is determined that the user erroneously operates the integrated control apparatus is a case in which the acceleration switch 14 and the brake switch 15 are simultaneously operated, and in the instant case, the PCB 17 recognizes a signal from the brake switch 15 as a high priority and generates a signal related to braking.

When an erroneous operation corresponding to the second case occurs, the haptic motor 18 is operated at a moderate intensity (a vibration displacement of 1.0 μm) or is operated to have a middle rest time (0.6 secs).

The moderate intensity (1.0 μm) of the haptic motor 18 may be defined as a value between the lowest intensity (0.5 μm) in the first case and the highest intensity (2.0 μm) in the third case, which will be described below, and the middle rest time (0.6 secs) may be defined as a value between the longest rest time (1.0 secs) in the first case and the shortest rest time (0.2 secs) in the third case, which will be described below.

As the result of the determination as to whether or not the user erroneously operates the switches provided in the integrated control apparatus (Operation S3), upon determining that the user does not erroneously operate the switches, it is determined whether or not a shifting disallowable situation occurs under the condition that the user operates the switches provided in the integrated control apparatus 10 (Operation S5).

The determination as to whether or not the shifting disallowable situation occurs (Operation S5) may be performed sequentially after Operation S3, or may be performed immediately after Operation S2.

As a result of the determining as to whether or not the shifting disallowable situation occurs (Operation S5), upon determining that the shifting disallowable situation does not occur, the haptic motor 18 provided in the integrated control apparatus 10 is not operated, and upon determining that the shifting disallowable situation occurs, the haptic motor 18 provided in the integrated control apparatus 10 is operated to generate a warning signal (Operation S4), and the user (the manager) may easily recognize that the shifting disallowable situation occurs through the tactile warning signal generated by the haptic motor 18.

Figure 6:
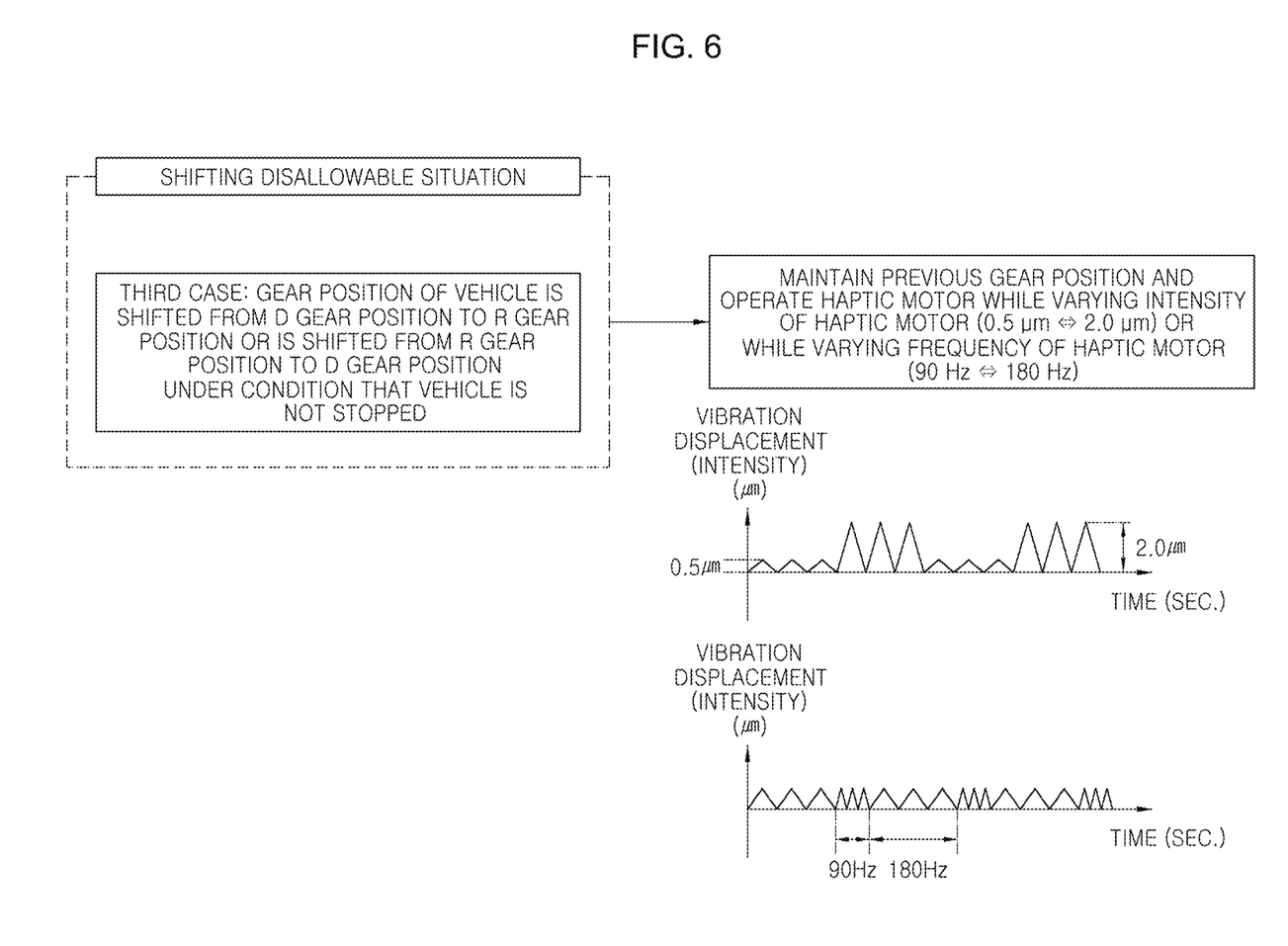

FIG. 6 illustrates an exemplary embodiment in which it is determined that the shifting disallowable situation occurs in Operation S5.

That is, the third case in which it is determined the shifting disallowable situation occurs is a case in which the gear position of the vehicle is shifted from the drive (D) gear position to the reverse (R) gear position or is shifted from the reverse (R) gear position to the drive (D) gear position by operating the shift switch 13 of the integrated control apparatus 10 under the condition that the vehicle is not stopped, and in the instant case, the haptic motor 18 is operated while varying the intensity of the haptic motor 18 (alternately at a vibration displacement of 0.5 μm and 2.0 μm) or while varying the frequency of the haptic motor 18 (alternately at a frequency of 90 Hz and 180 Hz).

As the result of the determination as to whether or not the shifting disallowable situation occurs (Operation S5), upon determining that the shifting disallowable situation does not occur, it is determined whether or not a collision risk occurs under the condition that the user utilizes the integrated control apparatus 10 (Operation S6).

The determination as to whether or not the collision risk occurs (Operation S6) may be performed sequentially after Operation S5, may be performed immediately after Operation S2, or may be performed after Operation S3.

As a result of the determining as to whether or not the collision risk occurs (Operation S6), upon determining that the collision risk does not occur, the haptic motor 18 provided in the integrated control apparatus 10 is not operated, and upon determining that the collision risk occurs, the haptic motor 18 is operated to generate a warning signal (Operation S4), and the user (the manager) may easily recognize that the collision risk occurs through the tactile warning signal generated by the haptic motor 18.

Figure 7:
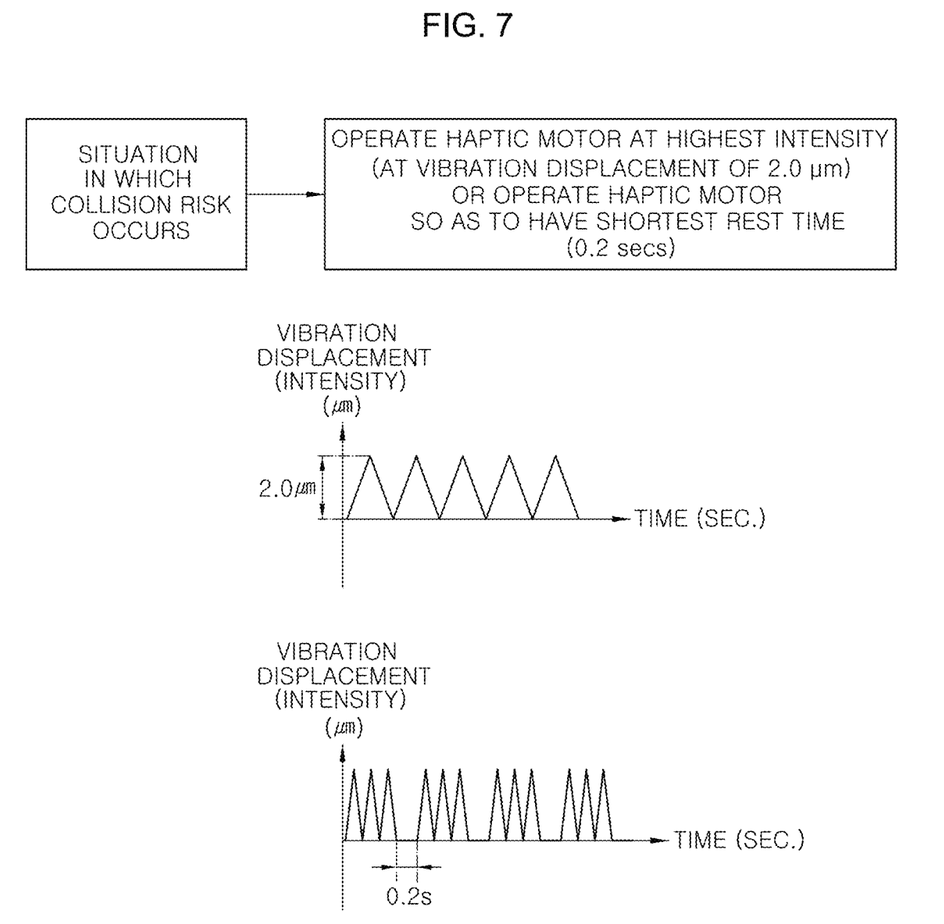

FIG. 7 illustrates an exemplary embodiment in which it is determined that the collision risk occurs in Operation S6.

That is, upon determining that the collision risk occurs, the haptic motor 18 is operated at the highest intensity (a vibration displacement of 2.0 µm, i.e., the maximum intensity higher than the intensities in the first case and the second case) or is operated to have the shortest rest time (0.2 secs, i.e., the minimum rest time shorter than the rest times in the first case and the second case).

Figure 8:
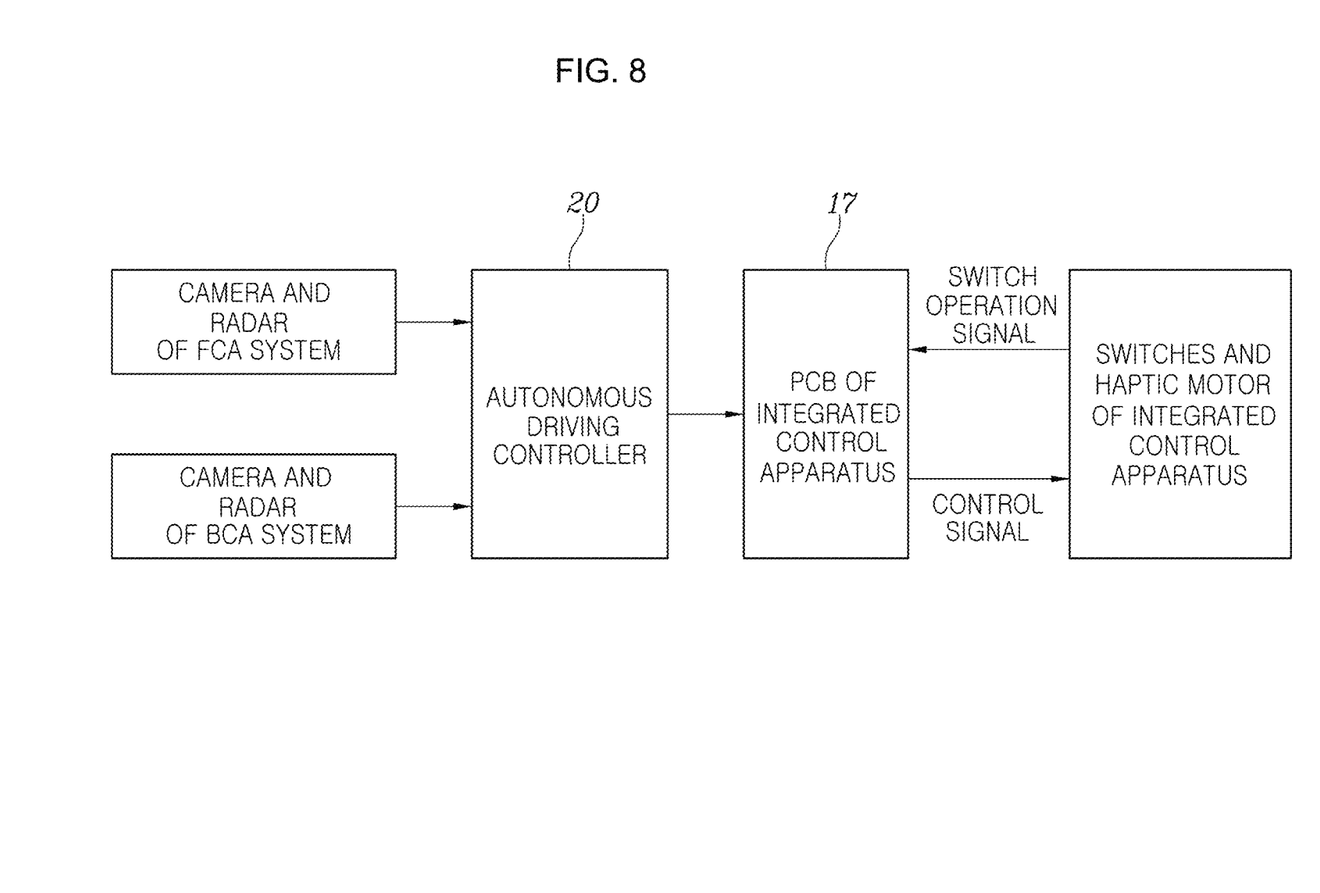
FIG. 8 is a block diagram illustrating a process for detecting a collision risk through detectors of a vehicle and then operating the haptic motor according to an exemplary embodiment of the present disclosure.

FIG. 8 is a block diagram illustrating a process for detecting a collision risk through detectors of the vehicle and then operating the haptic motor according to an exemplary embodiment of the present disclosure.

The detectors provided in the vehicle detect other vehicles or neighboring obstacles and then transmit signals while driving, the signals from the detectors are transmitted to an autonomous driving controller 20, and the autonomous driving controller 20 determines the collision risk by determining the driving speed of the host vehicle and the proximity degrees of the other vehicles or the neighboring obstacles to the host vehicle.

When the autonomous driving controller 20 determines that the collision risk occurs, the autonomous driving controller 20 transmits a control signal to the PCB 17 of the integrated control apparatus 10, the PCB 17 transmits the control signal to the haptic motor 18 of the integrated control apparatus 10 to operate the haptic motor 18, and the haptic motor 18 is operated to generate a tactile warning signal.

The detectors configured to transmit signals indicating the collision risk to the autonomous driving controller 20 may include cameras and radars of a Forward Collision-Avoidance Assist (FCA) system and a Blind-spot Collision-Avoidance Assist (BCA) system.

In various exemplary embodiments of the present disclosure, as described above, when the integrated control apparatus 10 is erroneously operated, when a collision risk occurs or when a shifting disallowable situation occurs under the condition that a user manually drives the vehicle by operating the integrated control apparatus 10, the haptic motor 18 provided in the integrated control apparatus 10 generates a warning signal, facilitating the user to recognize the warning signal through tactile sensation and thus being configured for reducing a danger of accidents.

Furthermore, different kinds of warning signals are generated by varying the operation of the haptic motor 18 depending on kinds of erroneous operations or when the collision risk occurs, and thus, the user may easily recognize respective cases through the corresponding warning signals.

As is apparent from the above description, in a method for generating a warning signal of an integrated control apparatus of autonomous vehicles, when the integrated control apparatus is erroneously operated, when a collision risk occurs or when a shifting disallowable situation occurs under the condition that a user manually drives a vehicle by operating the integrated control apparatus, a haptic motor provided in the integrated control apparatus generates the warning signal, facilitating the user to recognize the warning signal through tactile sensation and thus being configured for reducing a danger of accidents.

Furthermore, different kinds of warning signals are generated by varying the operation of the haptic motor depending on kinds of erroneous operations or when the collision risk occurs, and thus, the user may easily recognize respective cases through the corresponding warning signals.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for generating a warning signal of an integrated control apparatus of autonomous vehicles, the method comprising:
   determining whether at least one of switches provided in the integrated control apparatus are erroneously operated in response that a user manually drives a vehicle by operating the integrated control apparatus,
   wherein, as a result of the determining as to whether the at least one of the switches provided in the integrated control apparatus are erroneously operated, upon determining that the switches provided in the integrated control apparatus are not erroneously operated, a haptic motor provided in the integrated control apparatus is not operated, and upon determining that the at least one of the switches provided in the integrated control apparatus are erroneously operated in a predetermined case, the haptic motor is operated to generate the warning signal, and
   wherein the haptic motor is set to be operated at different intensities or to have different rest times depending on the predetermined case in which it is determined that the at least one of the switches provided in the integrated control apparatus are erroneously operated, as a result of the determining as to whether the at least one of the switches are erroneously operated.

2. The method of claim 1, wherein operation of the haptic motor is controlled by a printed circuit board (PCB) provided in the integrated control apparatus.

3. The method of claim 1,
   wherein the switches provided in the integrated control apparatus include an acceleration switch, a brake switch, a steering switch, a shift switch and a dead man's switch,
   wherein the predetermined case includes a case, and
   wherein the case in which it is determined that the at least one of the switches provided in the integrated control apparatus is erroneously operated is a case in which one of the acceleration switch, the brake switch, the steering switch and the shift switch is operated without operation of the dead man's switch.

4. The method of claim 3, wherein, in the case, the haptic motor is operated at a lowest intensity or vibration displacement or is operated to have a longest rest time.

5. A method for generating a warning signal of an integrated control apparatus of autonomous vehicles, the method comprising:
   determining whether at least one of switches provided in the integrated control apparatus are erroneously operated in response that a user manually drives a vehicle by operating the integrated control apparatus,
   wherein, as a result of the determining as to whether the at least one of the switches provided in the integrated control apparatus are erroneously operated, upon determining that the switches provided in the integrated control apparatus are not erroneously operated, a haptic motor provided in the integrated control apparatus is not operated, and upon determining that the at least one of the switches provided in the integrated control apparatus are erroneously operated in a predetermined case, the haptic motor is operated to generate the warning signal,
   wherein the switches provided in the integrated control apparatus include an acceleration switch, a brake switch, a steering switch, a shift switch and a dead man's switch,
   wherein the predetermined case includes a case, and
   wherein the case in which it is determined that the at least one of the switches provided in the integrated control apparatus are erroneously operated is a case in which the acceleration switch and the brake switch are simultaneously operated.

6. The method of claim 5, wherein, in the case, the haptic motor is operated at a moderate intensity or vibration displacement or is operated to have a middle rest time.

7. A method for generating a warning signal of an integrated control apparatus of autonomous vehicles, the method comprising:
   determining whether at least one of switches provided in the integrated control apparatus are erroneously operated in response that a user manually drives a vehicle by operating the integrated control apparatus; and
   determining whether a shifting disallowable situation occurs when the user operates the switches provided in the integrated control apparatus,
   wherein, as a result of the determining as to whether the at least one of the switches provided in the integrated control apparatus are erroneously operated, upon determining that the switches provided in the integrated control apparatus are not erroneously operated, a haptic motor provided in the integrated control apparatus is not operated, and upon determining that the at least one of the switches provided in the integrated control apparatus are erroneously operated in a predetermined case, the haptic motor is operated to generate the warning signal, and
   wherein, as a result of the determining as to whether the shifting disallowable situation occurs, upon determining that the shifting disallowable situation does not occur, the haptic motor provided in the integrated control apparatus is not operated, and upon determining that the shifting disallowable situation occurs, the haptic motor is operated to generate the warning signal and the vehicle maintains a previous gear position.

8. The method of claim 7,
   wherein the switches provided in the integrated control apparatus include an acceleration switch, a brake switch, a steering switch, a shift switch and a dead man's switch, and
   wherein a case in which it is determined that the shifting disallowable situation occurs is a case in which a gear position of the vehicle is shifted from a drive (D) gear position to a reverse (R) gear position or is shifted from the reverse (R) gear position to the drive (D) gear position in response that the vehicle is not stopped.

9. The method of claim 8, wherein, in the case, the haptic motor is operated while varying an intensity or vibration displacement of the haptic motor or while varying a frequency of the haptic motor.

10. The method of claim 1, further including:
determining whether a collision risk occurs in response that the user utilizes the integrated control apparatus,
wherein, as a result of the determining as to whether the collision risk occurs, upon determining that the collision risk does not occur, the haptic motor provided in the integrated control apparatus is not operated, and upon determining that the collision risk occurs, the haptic motor is operated to generate the warning signal.

11. The method of claim 10,
wherein an autonomous driving controller is configured to determine whether the collision risk occurs by receiving signals from detectors provided in the vehicle;
wherein upon determining that the collision risk occurs, the autonomous driving controller is configured to transmit a control signal to a printed circuit board (PCB) provided in the integrated control apparatus; and
wherein the haptic motor is operated under control of the PCB to generate the warning signal.

12. The method of claim 11, wherein the detectors configured to transmit the signals indicating the collision risk to the autonomous driving controller include cameras and radars of a Forward Collision-Avoidance Assist (FCA) system and a Blind-spot Collision-Avoidance Assist (BCA) system.

13. The method of claim 10, wherein, upon determining that the collision risk occurs, the haptic motor is operated at a highest intensity or vibration displacement or is operated to have a shortest rest time.

14. An integrated control apparatus of autonomous vehicles, the apparatus comprising:
an acceleration switch, a brake switch, a steering switch, a shift switch and a dead man's switch;
a haptic motor; and
a controller connected to the acceleration switch, the brake switch, the steering switch, the shift switch, the dead man's switch and the haptic motor,
wherein the controller is configured to:
determine whether at least one of the acceleration switch, the brake switch, the steering switch, the shift switch and the dead man's switch are erroneously operated in response that the controller concludes that a user manually drives a vehicle by operating the integrated control apparatus,
wherein, upon concluding that the acceleration switch, the brake switch, the steering switch, the shift switch and the dead man's switch are not erroneously operated, the haptic motor provided in the integrated control apparatus is not operated by the controller, and upon concluding that the at least one of the acceleration switch, the brake switch, the steering switch, the shift switch and the dead man's switch are erroneously operated in a predetermined case, the haptic motor is operated by the controller, depending on the predetermined case to generate a warning signal,
wherein the controller is configured to determine whether a collision risk occurs in response that the user utilizes the integrated control apparatus, and
wherein upon concluding that the collision risk does not occur, the controller is configured to not operate the haptic motor, and upon concluding that the collision risk occurs, the controller is configured to operate the haptic motor to generate the warning signal.

15. The apparatus of claim 14,
wherein the controller is further configured to determine whether a shifting disallowable situation occurs in response that the controller concludes that the user operates the acceleration switch, the brake switch, the steering switch, the shift switch and the dead man's switch, and
wherein, upon concluding that the shifting disallowable situation does not occur, the haptic motor provided in the integrated control apparatus is not operated by the controller, and upon concluding that the shifting disallowable situation occurs, the haptic motor is operated by the controller to generate the warning signal and the vehicle maintains a previous gear position.

* * * * *